(12) United States Patent
Langendorf

(10) Patent No.: US 6,624,817 B1
(45) Date of Patent: Sep. 23, 2003

(54) SYMMETRICAL ACCELERATED GRAPHICS PORT (AGP)

(75) Inventor: Brian K. Langendorf, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,661

(22) Filed: Dec. 31, 1999

(51) Int. Cl.[7] .............................................. G06F 13/14
(52) U.S. Cl. ....................... 345/520; 345/503; 710/309; 710/310
(58) Field of Search ................................ 345/502, 503, 345/505, 506, 520, 519, 531, 538, 535; 710/107, 112, 305, 306, 309, 310

(56) References Cited

U.S. PATENT DOCUMENTS

| | | | |
|---|---|---|---|
| 4,937,745 A | | 6/1990 | Carmon |
| 5,434,968 A | | 7/1995 | Kunii et al. |
| 5,502,808 A | * | 3/1996 | Goddard et al. ............ 345/535 |
| 5,530,798 A | * | 6/1996 | Chu et al. .................... 345/213 |
| 5,606,657 A | * | 2/1997 | Dennison et al. ........... 345/501 |
| 5,712,664 A | * | 1/1998 | Reddy ......................... 345/503 |
| 5,892,964 A | | 4/1999 | Horan et al. ........... 395/800.23 |
| 5,986,677 A | * | 11/1999 | Jones et al. ................. 345/531 |
| 6,141,021 A | * | 10/2000 | Bickford et al. ............ 345/503 |
| 6,157,398 A | * | 12/2000 | Jeddeloh ..................... 345/532 |
| 6,211,891 B1 | | 4/2001 | Wahlig |
| 6,275,240 B1 | | 8/2001 | Riffault |
| 6,286,083 B1 | * | 9/2001 | Chin et al. .................. 710/241 |
| 6,304,935 B1 | * | 10/2001 | Strongin ..................... 345/520 |
| 6,326,973 B1 | * | 12/2001 | Behrbaum et al. .......... 345/520 |

OTHER PUBLICATIONS

Intel Corporation, "Accelerated Graphics Port Specification", Revision 2.0, May 4, 1998, pp. 1–29 and 31–77.
Intel Corporation, "A.G.P. Three Load Bus Issues and Analysis", Revision 0.4, Jan. 20, 1998, pp. 1–33.

* cited by examiner

Primary Examiner—Kee M. Tung
(74) Attorney, Agent, or Firm—Blakely, Sokoloff, Taylor & Zafman LLP

(57) ABSTRACT

Apparatus and methods are provided for allowing two graphics controllers to cooperate on a single screen and for modifying the AGP protocol to provide symmetric capabilities for both AGP targets and AGP masters. According to one embodiment of the present invention, an Accelerated Graphics Port (AGP) master may initiate a data transaction. A graphics controller receives an AGP transaction request from a core logic device. The graphics controller buffers the AGP transaction request in a request queue. Then, the graphics controller initiates a data transaction in response to the AGP transaction request. According to another embodiment of the present invention, an AGP target may issue AGP transaction requests. The integrated graphics controller issues an AGP transaction request to a graphics controller residing on an expansion card. Subsequently, the integrated graphics controller receives an indication on a status bus that the graphics controller residing on the expansion card is ready to initiate a data transaction in response to the AGP transaction request. If the AGP transaction request is an AGP read transaction, then the integrated graphics controller receives read data from the graphics controller. Otherwise, if the AGP transaction request is an AGP write transaction, then the integrated graphics controller sources write data to the graphics controller residing on the expansion card.

12 Claims, 10 Drawing Sheets

SYMMETRICAL ACCELERATED GRAPHICS PORT (AGP)

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to graphics subsystems in personal computers. More particularly, the invention relates to an upgrade solution for an integrated graphics controller and various Accelerated Graphics Port (AGP) protocol modifications to provide symmetric capabilities to both AGP targets and AGP masters.

2. Description of the Related Art

All modern personal computers (PCs) contain a graphics subsystem. Through the years, this subsystem has increased in sophistication to the point that 2D acceleration, 3D acceleration, and video functions are considered standard in all PCs. The usage model of a 3D graphics controller exhibits a very asymmetric traffic pattern. The processor tends to deliver commands to the graphics controller by writing directly to it or by writing command buffers in memory. While the command traffic may be a fairly large amount of traffic in an absolute sense, it is a small percentage of the total traffic between the core logic chipset and the graphics controller. Most of the traffic is a result of the graphics controller initiating access to and interfacing with main memory. Typically, the graphics controller is reading from main memory. For example, the graphics controller may access texture information directly from main memory or swap in the next chunk of geometry. In order to keep the complexity of the definition down, the Accelerated Graphics Port (AGP) specification defines a "port" capable of supporting only two active device, an initiator (or master) and a target, having asymmetric capabilities.

While traditionally, in order to preserve flexibility, the graphics controller has been implemented as a discreet component, it has been found that integrating the graphics controller with the North Bridge of the core logic chipset can produce solutions with better price/performance ratios. Such integration, however, removes flexibility in the selection of the graphics subsystem. Since motherboard and system vendors commonly use the graphics subsystem as an area to differentiate their systems and the graphics subsystem is one of the most rapidly changing areas within PCs, it is important to retain an upgrade path for any graphics subsystem design.

In a system employing Accelerated Graphics Port (AGP) enabled devices, as illustrated in FIG. 1A, upgrading the graphics subsystem presently requires a system's existing graphics controller to be disabled in favor of an upgraded graphics controller residing on an add-in card. The system of FIG. 1A includes a chipset 110 that acts as the target of AGP requests from motherboard graphics 130. The chipset 110 and motherboard graphics 130 communicate by way of an AGP bus 111. Also coupled to the AGP bus 111 is an AGP connector 120. The AGP connector 120 provides an upgrade path for the motherboard graphics 130 by allowing installation of an expansion card. However, because the AGP protocol was developed without the concept of a three load bus, only two devices, an AGP master and an AGP target, may be enabled at a time.

Consequently, as illustrated in FIG. 1B, when an AGP expansion card 140 is installed, it replaces the existing AGP graphics controller 130 which must be disabled and therefore becomes dormant. In a system employing an integrated graphics controller, such an upgrade mechanism would result in a significant waste of resources as the integrated graphics controller may easily represent over a million gates.

BRIEF SUMMARY OF THE INVENTION

According to one embodiment of the present invention, an Accelerated Graphics Port (AGP) master may initiate a data transaction. A graphics controller receives an AGP transaction request from a core logic device. The graphics controller buffers the AGP transaction request in a request queue. Then, the graphics controller initiates a data transaction in response to the AGP transaction request.

Other features and advantages of the invention will be apparent from the accompanying drawings and from the detailed description.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1B:
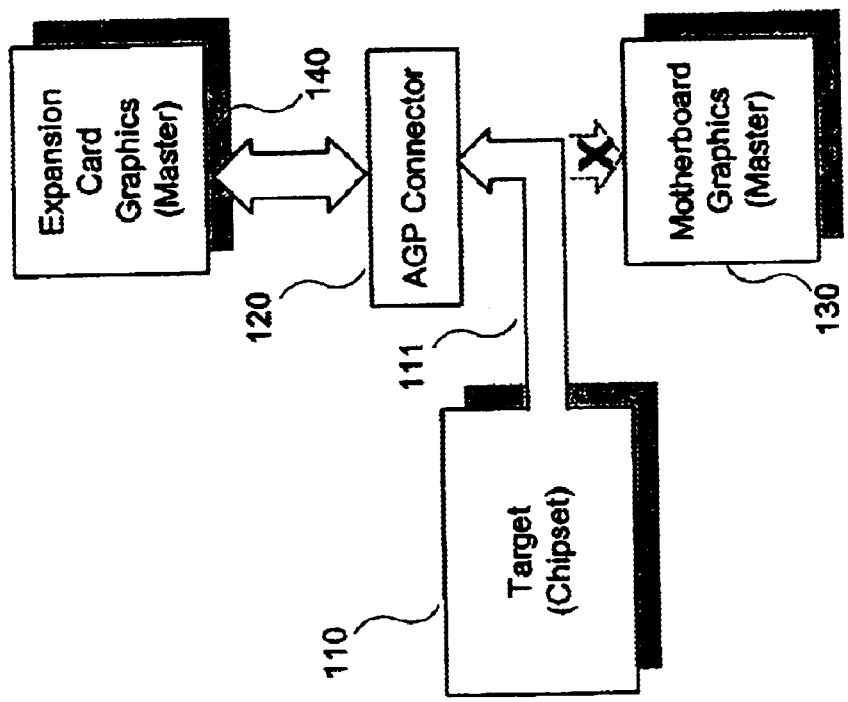
FIG. 1B illustrates a prior approach for upgrading the graphics subsystem of FIG. 1A.
Figure 1A:
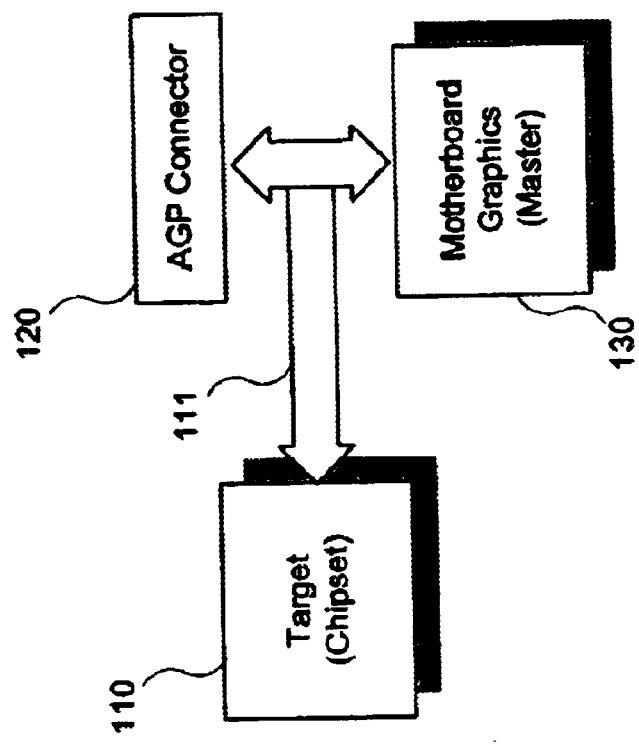
FIG. 1A is a block diagram of an AGP enabled graphics subsystem.

Apparatus and methods are provided for allowing two graphics controllers to cooperate on a single screen and for modifying the AGP protocol to provide symmetric capabilities for both AGP targets and AGP masters. Broadly stated, embodiments of the present invention seek to provide a technique for providing an efficient upgrade path for an integrated graphics subsystem of a PC-compatible system. For example, according to one embodiment, an AGP bus may have two devices attached to it: (1) a core logic device having an integrated graphics subsystem, and (2) a card slot in which an upgrade graphics controller add-in card may be installed. Rather than disabling the embedded graphics controller when the upgrade graphics controller is present, the two graphics controllers can cooperate. In one embodiment, the invention enables the design of high performance graphics systems that distributes graphics workload with minimal enhancements to the AGP protocol. For example, the two graphics controllers may transfer data between each other using modified AGP signaling which enables symmetric capabilities for both AGP targets and AGP masters.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a generalDocket purpose or special-purpose processor or logic circuits programmed with the instructions to perform the steps. Alternatively, the steps may be performed by a combination of hardware and software.

Importantly, while embodiments of the present invention will be described with reference to the Accelerated Hub Architecture upon which the Intel® 810 chipset is based, the method and apparatus described herein are equally applicable to other types of chipset partitioning, such as integration of graphics cores into the traditional chipset north bridge (INTEL is a trademark or registered trademark of Intel Corporation of Santa Clara, Calif.).

Additionally, for convenience, embodiments of the present invention will be described with reference to spatial partitioning, e.g., two graphics controllers doing the same type of work but on different portions of a frame buffer. However, the present invention is equally applicable to other types of partitioning, such as functional partitioning in which the controllers split the front and back of the graphics pipeline. For example, one graphics controller, e.g., the integrated graphics controller, may perform the geometry stage of the graphics pipeline and the other graphics controller, e.g., the external device may perform setup and rendering. Alternatively, the controllers may cooperate to pre-compute an intermediate result, such as calculating the resulting color for one texture of a multi-textured triangle. Of course, various other functional partitioning approaches may be employed.

Finally, for clarity, embodiments of the present invention are described with reference to the use of two cooperating graphics controllers. It is contemplated, however, that multiple graphics controllers may be employed by coupling each to a common connection fabric.

Terminology

Before describing an exemplary environment in which various embodiments of the present invention may be implemented, some terms that will be used throughout this application will briefly be defined.

"Accelerated Graphics Port" (AGP) is a high-performance bus specification, as described in the *Accelerated Graphics Port Interface Specification*, Revision 2.0, May 4, 1998 and subsequent revisions thereto, that is designed for fast, high-quality display of 3D graphics and video images.

The term "master" generally refers to the initiator of AGP transactions to transfer data to or from main memory. AGP contemplates the graphics controller acting as the master of AGP transactions. That is, the graphics controller issues transaction requests and the core logic later initiates the corresponding data transaction.

The term "target" generally refers to the AGP device, e.g., the core logic, that services the request of the master.

The term "virtual wire function" generally refers to replacing something that had previously been signaled explicitly with a command type on a shared bus. For example, virtual wire functions can be used to assert and deassert signals without affecting state machine operation as the only difference is the signal is received as a result of a command decode rather than a buffer receiving and synchronizing a pin.

The term "chunking" generally refers to a mechanism used to take advantage of 2D locality to optimize page hits whereby a graphics controller operates on a rectangular portion of the screen representing a portion of multiple scanlines. Because it is very likely that adjacent pixels will need the same texture values, chunking can achieve better performance than simple-mindedly operating on a single scanline at a time.

Integrated AGP Architecture Overview

Figure 2:
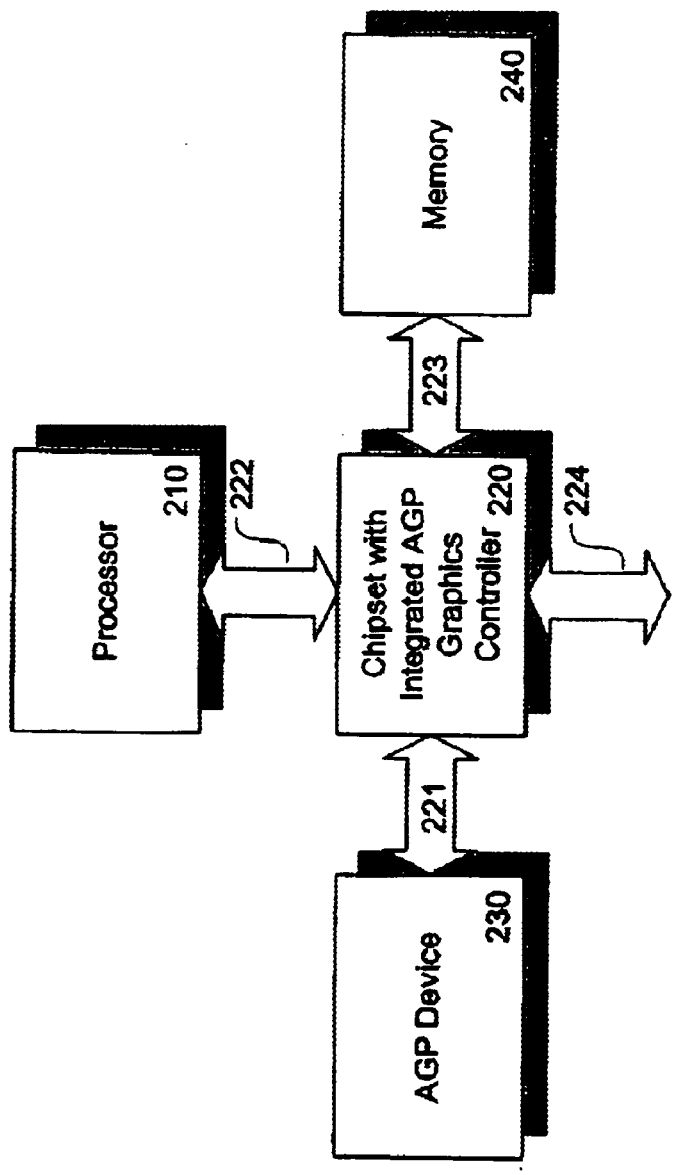
FIG. 2 is a block diagram of a system utilizing an integrated graphics chipset according to one embodiment of the present invention.

FIG. 2 is a block diagram of a system: utilizing an integrated graphics chipset 220 according to one embodiment of the present invention. The architecture depicted includes a processor 210, an AGP device 230, and a memory 240. The chipset 220 is coupled to the AGP device 230, the processor 210, and the memory 240 through an AGP bus 221, a processor bus 222, and a memory bus 223, respectively. The chipset 220 may represent a traditional chipset north bridge having an integrated graphics core. However, preferably, the chipset 220 has an architecture similar to that of the Intel 810 chipset which includes a memory controller (not shown) with built-in graphics technology (integrated AGP) and is based on the Accelerated Hub Architecture. The Accelerated Hub Architecture is capable of providing each critical multimedia subsystem with a direct link to the chipset 220. For example, in addition to the interfaces discussed above, the chipset 220 may also include direct interfaces for IDE (Intelligent Drive Electronics or Integrated Drive Electronics), audio, modem, and USB subsystems.

Virtual Graphics Controller Overview

According to embodiments of the present invention, rather than disabling an existing AGP graphics controller when an AGP expansion card is installed as illustrated in FIG. 1B, a mechanism is provided for allowing the integrated AGP graphics controller and the upgrade graphics controller to cooperate as one virtual graphics controller. Advantageously, in this manner, a significant amount of resources may be conserved.

At any rate, in order to keep the complexity of the virtual graphics controller environment down, preferably a single driver with minor enhancements is used to command the integrated graphics product, the discreet graphics product, and the performance enhanced system that includes both controllers. Additionally, the description herein assumes that both controllers have compatible command sets, thereby allowing the driver to lay down a single command list comprising commands from a common command set that the controllers independently process. Advantageously, in this manner, the driver can lay down commands without caring which of the graphics controllers is going to execute the command. It is not necessary that each controller understand all commands understood by the other; however, preferably there exists a reasonably sized subset of commands that can be processed by both controllers.

In alternative embodiments, the driver may deal with each graphics controller on an individual basis. For example, the driver may divide the commands among the two or more cooperating graphics controllers by laying down two different command lists, for example. However, this approach is thought to reduce performance since too much time would be spent in the driver making these decisions.

Figure 3A:
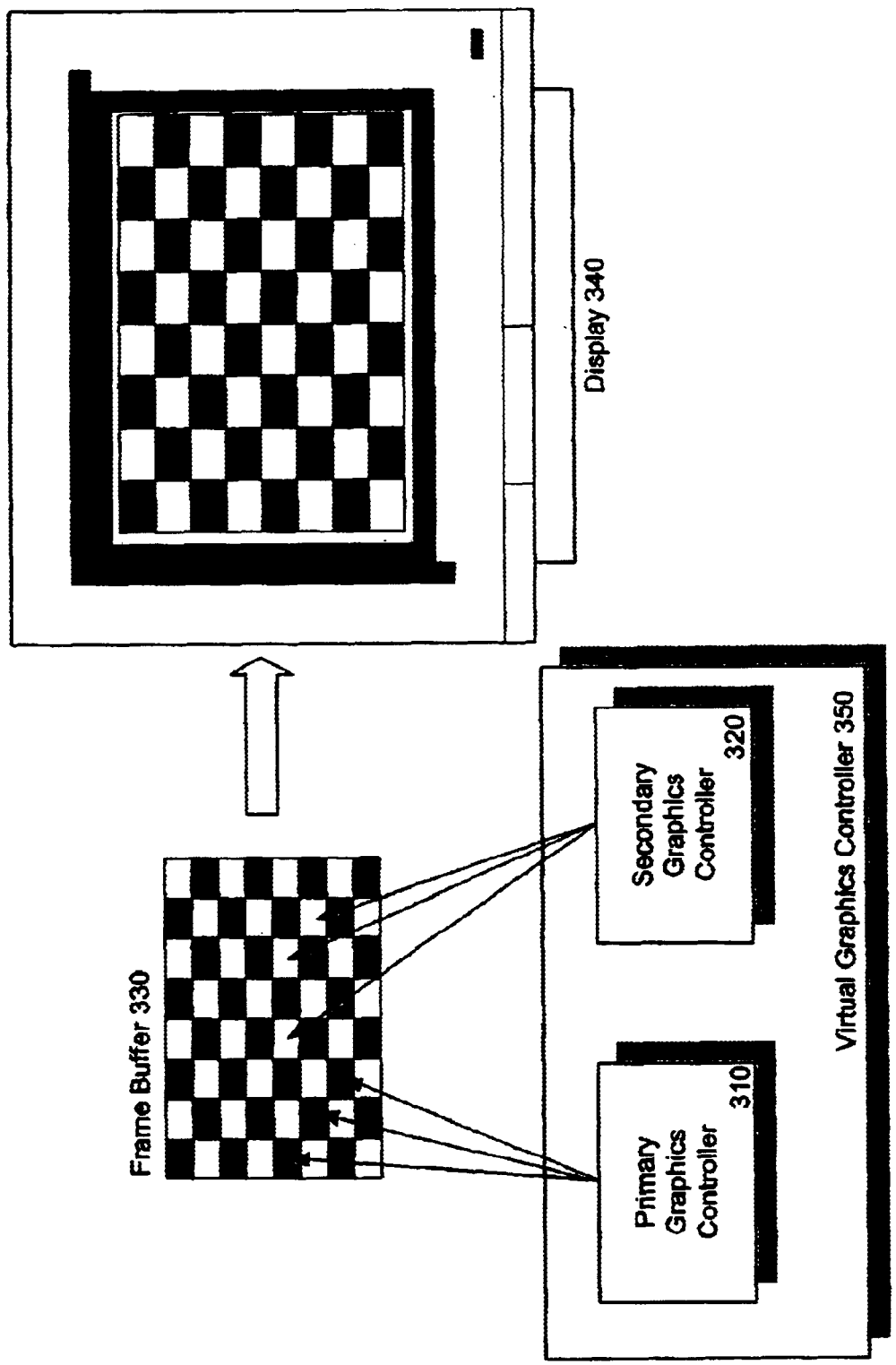
FIG. 3A conceptually illustrates two graphics controllers cooperating on a single screen according to one embodiment of the present invention.

Referring now to FIG. 3A, the cooperation of two graphics controllers as a virtual graphics controller 350 will now be described. According to this conceptual illustration, the virtual graphics controller 350 includes a primary graphics controller 310 and a secondary graphics controller 320 that update the contents of a frame buffer 330. The frame buffer 330 is a portion of memory from which the screen is rendered. As such, the frame buffer 330 contains a complete bit-mapped image representation of what is to be displayed on the monitor 340. For example, the frame buffer 330 includes information regarding the color to paint each pixel of the screen. The location of the frame buffer 330 has changed over time and is not a primary concern. According to one embodiment, the frame buffer 330 may be stored in memory local to the primary graphics controller 310. However, in alternative embodiments, the frame buffer 330 may be represented as a portion of main memory 240. Preferably, the frame buffer 330 implements a multiple buffering scheme. For example, the frame buffer 330 may includes a front buffer from which the screen is updated and a back buffer to which the graphics controllers 310 and 320 write while the front buffer is being displayed. When the display update is complete, then the front buffer becomes the back buffer, the back buffer becomes the front buffer, and the process continues. In alternative embodiments, more than one back buffer may be employed in which case a queue of back buffers may be provided thereby allowing the graphics controllers 310 and 320 to render one or more frames ahead of the currently displayed frame.

Figure 3C:
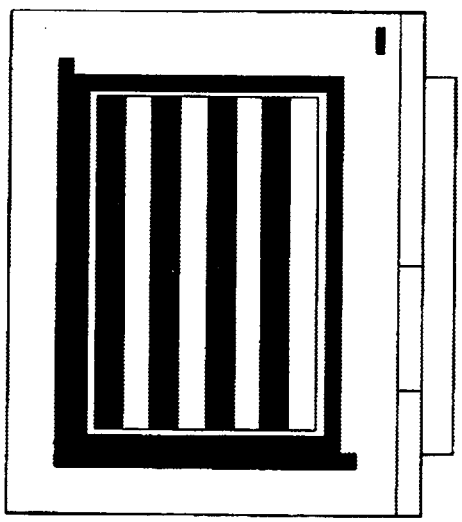
FIGS. 3B–3E conceptually illustrate other ways of dividing the screen according to alternative embodiments of the present invention.
Figure 3E:
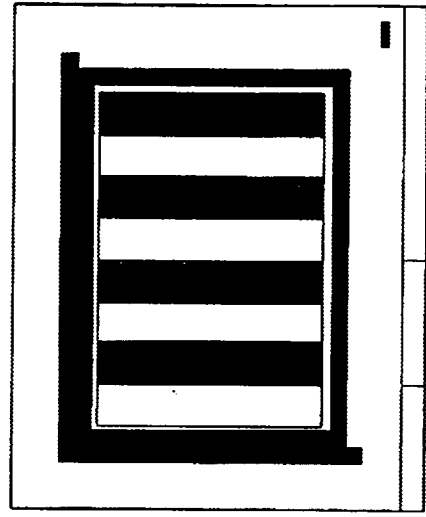
Figure 3B:
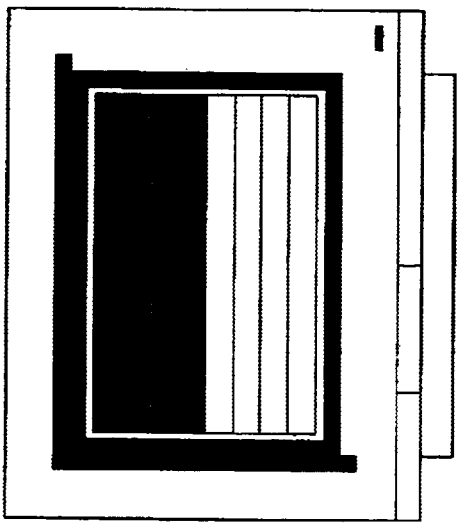
Figure 3D:
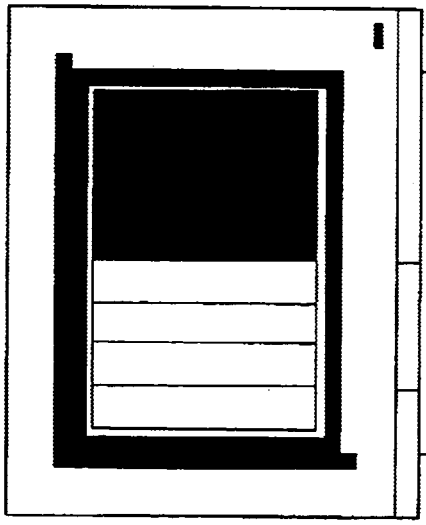

In this example, division of work between the controllers 310 and 320 has been accomplished by assigning portions, e.g., chunks, of the frame buffer 330 to the graphics controllers 310 and 320 according to a checker board pattern. Specifically, responsibility for rendering of the dark rectangular regions of the frame buffer 330 has been allocated to the primary graphics controller 310 and responsibility for the white regions has been assigned to the secondary graphics controller 320. Various other allocations of the frame buffer 330 may be employed to coordinate the processing of the graphics controllers 310 and 320. For example, FIGS. 3B–3E conceptually illustrate other ways of dividing the screen according to alternative embodiments of the present invention. According to FIG. 3B, one of the graphics controllers is responsible for the upper portion of the screen and the other updates the portion of the frame buffer 330 corresponding to the lower portion of the screen. In the example of FIG. 3C, alternating horizontal stripes comprising one or more horizontal scanlines have been assigned to the controllers 310 and 320. FIG. 3D depicts an allocation in which one controller updates the portion of the frame buffer 330 corresponding to the right-hand portion of the screen and the other is responsible for the left-hand portion of the screen. Finally, FIG. 3E represents an assignment whereby alternating vertical stripes are handled by the controllers.

Importantly, these examples are not intended to be exhaustive or limiting on the invention, rather they are intended merely to illustrate a sampling of the many possible ways of physically allocating portions of a single screen between two cooperating graphics controllers 310 and 320.

Various tradeoffs should be kept in mind when deciding upon a way to partition the screen. While finer granularity will result in better load balancing, smaller strips may require more overhead. For example, if texture averaging is to be performed along the strip boundaries, then overhead in terms of retrieving texture information will be high because both graphics controllers will need to access the same texture information. Therefore, generally speaking, smaller strips are desirable for load balancing, while larger strips are preferable if the goal is to avoid overlap of things like texture load.

Virtual Graphics Controller Processing

Figure 4:
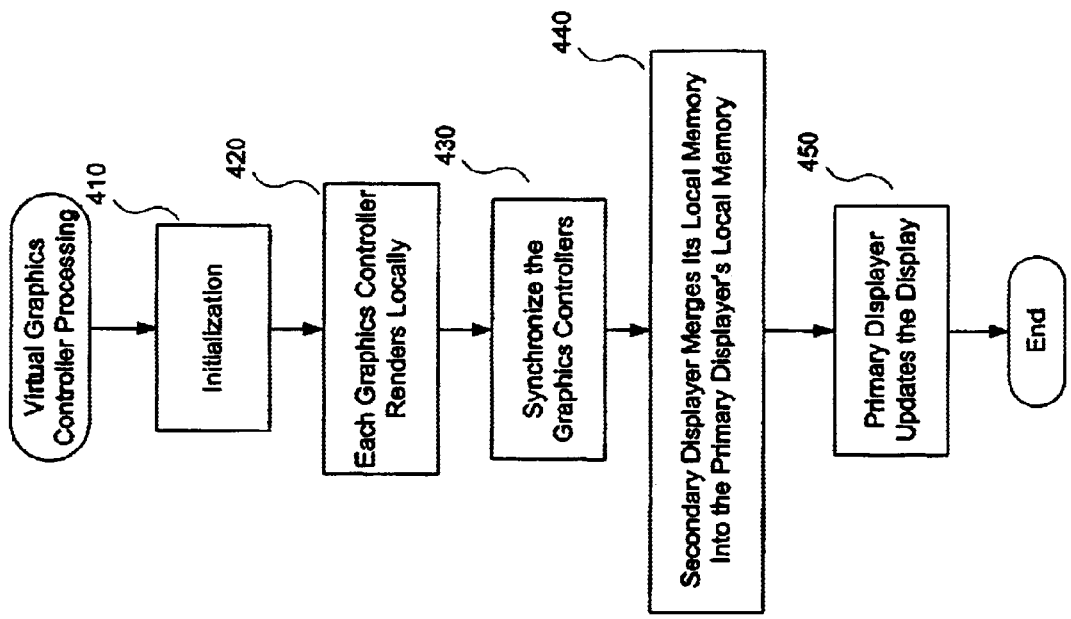
FIG. 4 is a flow diagram illustrating virtual graphics controller processing according to one embodiment of the present invention.

FIG. 4 is a flow diagram illustrating virtual graphics controller processing according to one embodiment of the present invention. In one embodiment, the steps described below may be performed under the control of a programmed processor. However, in alternative embodiments, the steps may be fully or partially implemented by any programmable or hardcoded logic, such as Field Programmable Gate Arrays (FPGAs), TTL logic, or Application Specific Integrated Circuits (ASICs), for example. Briefly, in this example, one controller is initialized as the primary displayer, the other is established as the secondary displayer, and each controller renders to a local memory. When both of the controllers have completed processing the commands associated with their portion of the screen, the secondary displayer merges the information from its local memory into the local memory of the primary displayer and primary displayer displays the resulting complete bit-mapped image on the screen.

At step 410, initialization is performed. For example, the screen partitioning, e.g., strip allocations, may be established by the driver. Additionally, the graphics controllers may each receive an indication from the driver that another graphics controller will be sharing the workload. Finally, each of the graphics controllers may be assigned primary or secondary responsibility for certain functions, such as display, synchronization, acknowledgement, etc.

At step 420, each graphics controller renders the pixels it has been assigned to its local memory. It should become apparent that half the time the data the graphics controller 310 needs for rendering must be read from graphics controller 320 and vice versa. For example, a bit-block transfer (bitblt) to move a rectangle from one portion of the screen to another in which pixels from where the rectangle started are in the portion of the frame buffer 330 controlled by graphics controller 320 and pixels where the rectangle is to be moved are in the portion of the frame buffer 330 controlled by graphics controller 310 will require data to be transferred from graphics controller 320 to graphics controller 310. An approach for determining which graphics controller is responsible for initiating the information transfer and updates involving such pixels moving from a portion of the screen being managed by one controller to a portion of the screen allocated to the other is described below.

At step 430, the graphics controllers are synchronized to assure both graphics controllers have completed rendering prior to performing the merge operation. Advantageously, this allows graphics controllers of differing speeds and/or spatial partitions resulting in disproportionate loads to be accommodated. Exemplary control and synchronization mechanisms for coordinating the processing of two or more cooperating graphics controllers are described below.

At step 440, the graphics controller that has been designated as the secondary displayer merges the contents of its local memory into the local memory of the primary displayer by initiating a write transaction.

Finally, at step 450, the primary displayer updates the display.

Figure 5:
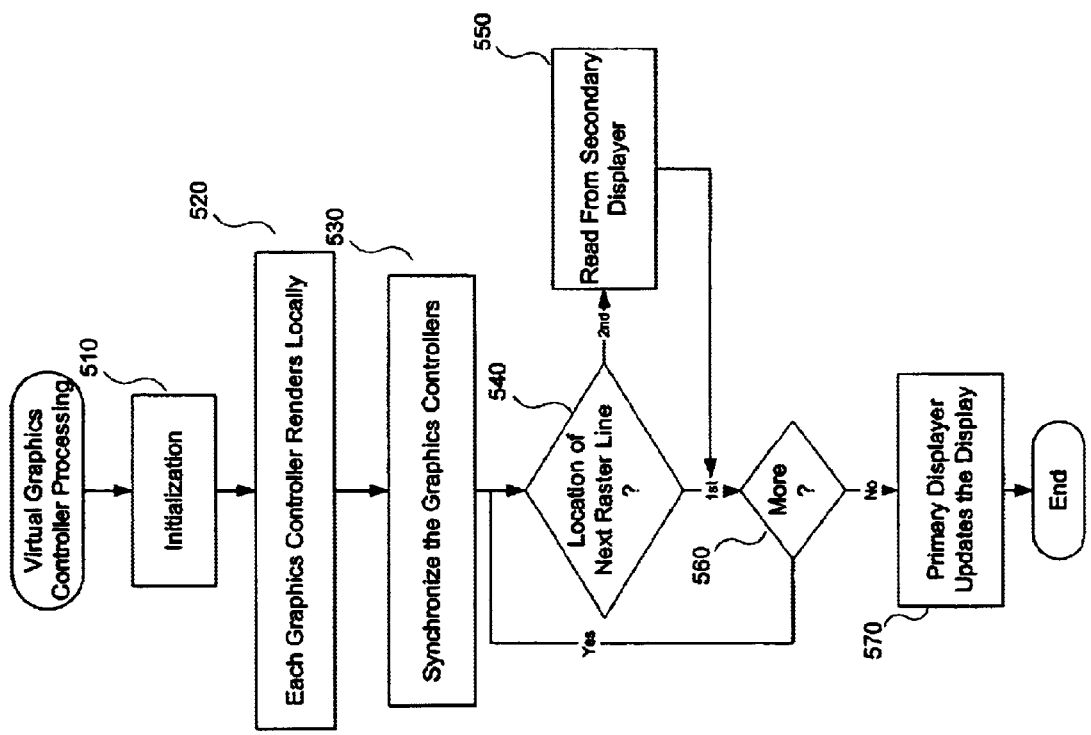
FIG. 5 is a flow diagram illustrating virtual graphics controller processing according to another embodiment of the present invention.

FIG. 5 is a flow diagram illustrating virtual graphics controller processing according to another embodiment of the present invention. Briefly, in this example, no merging is performed. Rather, the primary displayer device knows what the display map looks like and when it needs to display a raster line that exists locally on the other graphics controller, it simply reads it from the other graphics controller. In such a situation, symmetrical AGP capabilities become desirable as both graphics controllers are performing rendering and will each inevitably need to read from the other to accomplish their rendering. Modified signaling to accomplish symmetrical AGP is described below.

At step 510, initialization of the graphics controllers is performed. As described above, initialization may include, spatial partitioning of the screen and designation as the primary or secondary controller responsible for various tasks, such as displaying, synchronization, and/or acknowledgement, e.g., strip allocations, may be established by the driver.

At step 520, each graphics controller renders locally. At step 530, the graphics controllers are synchronized.

Then, display processing begins at step 540 where a determination is made regarding the location of the next raster line. This determination may be made with reference to the display map provided to the primary displayer during initialization. At any rate, if the next raster line is located in the memory of the secondary displayer, then processing continues with step 550. However, if the current raster line is located in the primary displayer, then processing proceeds to step 560.

At step 550, the primary displayer reads the next raster line from the secondary displayer. Subsequently, control flows to step 560.

At step 560, if more raster lines need to be processed, then processing loops back up to step 540; otherwise, processing continues to step 570.

Regardless of the location of the raster lines previously during step 540, at step 570, the all the raster data is now local to the primary displayer and the primary displayer can update the display.

Destination Dominant Rendering Approach

An approach for determining which graphics controller is responsible for updates involving a pixel that moves from a portion of the screen being managed by one controller to a portion of the screen allocated to the other will now be described. For example, as described above, in the case of a bit-block transfer (bitblt), pixels in one graphics controller's area of responsibility may end up in the other graphics controller's portion of the screen. In such a situation, source information needed to perform rendering processing by the graphics controller to which the destination pixels are assigned resides in the other controller. In one embodiment, a destination dominant approach may be employed to determine which controller is responsible for rendering such a pixel. According to the destination dominant rendering approach, whichever controller has the destination pixel local to it for rendering is responsible for the move, e.g., responsible for reading the information for updating the pixel from the other. Importantly, in such situations, it may be helpful to maintain local scratch pads in which a copy of the needed information from the other graphics controller may be read and stored before it is overwritten by the other graphics controller's rendering processing.

Chunking

Figure 6:
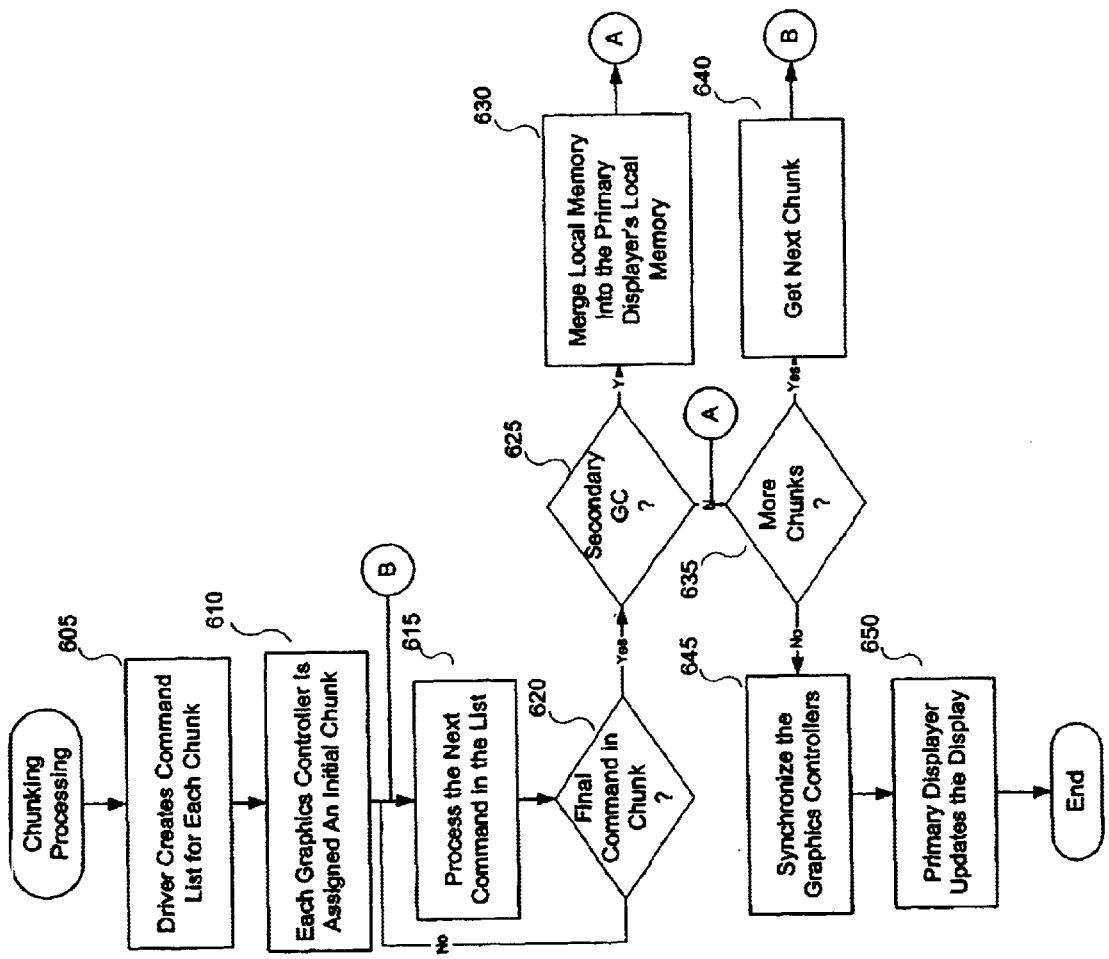
FIG. 6 is a flow diagram illustrating chunking processing according to one embodiment of the present invention.

FIG. 6 is a flow diagram illustrating chunking processing according to one embodiment of the present invention. Previous embodiments have focused on spatial partitioning; however, better load balancing may be achieved by the chunking technique that will now be described. Briefly, rather than assigning a predetermined portion of the frame buffer to each of the graphics controllers 310 and 320, each graphics controller 310 and 320 may independently pull a group of commands associated with a chunk from a common pool at its own rate. Advantageously, in this manner, the faster of the graphics controllers 310 and 320 will necessarily and appropriately perform more work.

At step 605, the driver creates command lists for each chunk. Each graphics controller 310 and 320 is assigned an initial chunk at step 610. Then, the graphics controllers 310 and 320 essentially begin to independently process chunks at their own pace.

At step 615, the graphics controller processes the next command from the list associated with its assigned chunk.

At step 620, if the command is the final one for the chunk, then processing continues with step 625. Otherwise, processing loops back to step 615.

At step 625, if the graphics controller is the secondary graphics controller, then processing continues with step 630. Otherwise, if the graphics controller is the primary graphics controller, then processing proceeds to step 635.

At step 630, the secondary graphics controller merges the content of its local memory into that of the primary graphics controller. After step 630, processing continues with step 635.

At step 635, the graphics controller determines if any more chunks are available for processing. If not, processing branches to step 645. If there are more chunks available in the common pool of chunks, then processing proceeds to step 640.

At step 640, the graphics controller is assigned the next chunk from the common pool and processing loops back to step 615.

At step 645, the graphics controllers 310 and 320 are synchronized according to one of the techniques described below and processing continues with step 650.

Finally, at step 650, after the graphics controllers 310 and 320 have been synchronized, the primary displayer causes the display to be updated with the contents of its local memory.

In the worst case, when the first graphics controller is finished, e.g., all chunks have been exhausted from the common pool, it will be only a portion of a chunk ahead of the other thereby minimizing the wait time for the first finisher.

Current AGP Signaling

Figure 7:
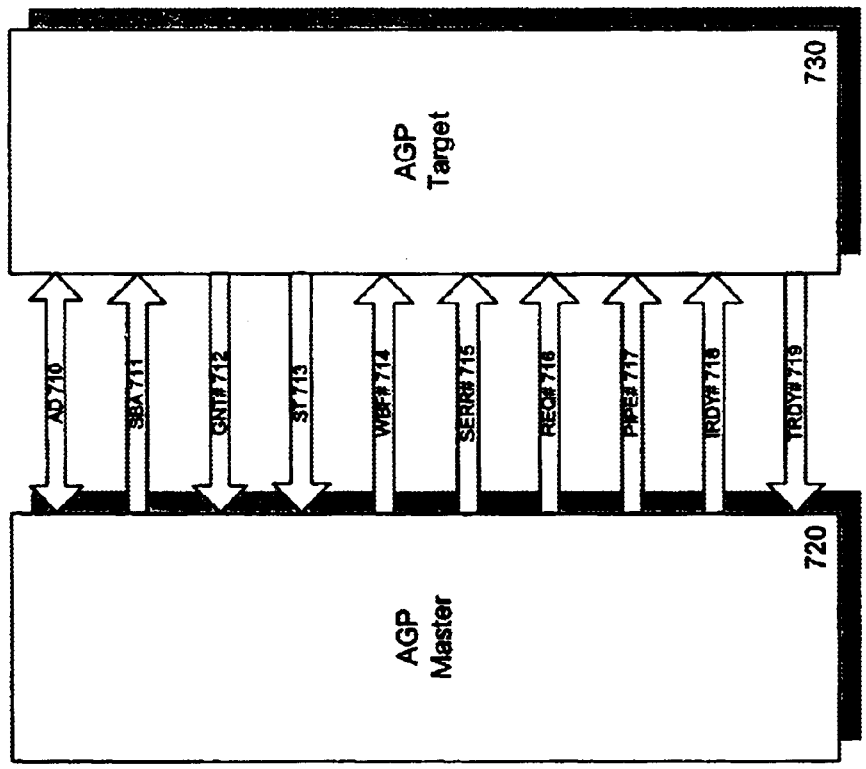
FIG. 7 is a simplified block diagram that illustrates current Accelerated Graphics Port (AGP) signaling.

FIG. 7 is a simplified block diagram that illustrates current Accelerated Graphics Port (AGP) signaling between an AGP master 720 and an AGP target 730. The signals depicted in this example include: an Address/Data (AD) bus 710, a sideband address (SBA) port 711, a grant (GNT#) signal 712, a status (ST) bus 713, a write buffer full (WBF#) signal 714, a system error (SERR#) signal 715, a bus request (REQ#) signal 716, a pipeline (PIPE#) signal 717, an initiator ready (IRDY#) signal 718, and a target ready (TRDY#) signal 719.

The Address/Data (AD) bus 710 is the physical data conduit between the master 720 and the target 730 during data transactions. The master 720 sources write data on the AD bus 710 for write data transactions; and the target 730 sources read data on the AD bus 710 for read data transactions. As a multiplexed address/data bus, the AD bus 710 may be used to transfer both request information as well as data. However, when requests are issued over the sideband address port (SBA) 711, the AD bus 710 may be used solely for the transfer of data between the master 720 and the target 730.

The sideband address (SBA) port 711 may be used by the AGP master 720 to issue transaction requests to the AGP target 730 rather than issuing transaction requests over the AD bus 710 and C/BE bus (not shown). Either PIPE# 717 and the AD bus 710 and C/BE bus are used to issue transaction requests, or the SBA 711. Therefore, if a master 720 implements the SBA 711, there is no need to implement the PIPE# mechanism.

The grant (GNT#) signal 712 is asserted by the AGP target 730 to indicate the grant of ownership to the AGP master 720 of the bus(ses) over which transaction requests are issued, e.g., the PIPE# bus 717, the AD bus 710 and the C/BE bus or the SBA bus 711.

The status (ST) bus 713 is used by the AGP target to indicate the reason for the grant of transaction bus ownership to the AGP master 720.

The write buffer full (WBF#) signal 714 is an optional signal that may be used as an output by the master 720 to inhibit fast write transactions.

The system error (SERR#) signal 715 is an optional signal used to indicate the detection of an address phase parity error, or some other critical error.

The bus request (REQ#) signal 716 is asserted by the AGP master 720 to request ownership of the AD bus 710 and the C/BE bus so the AGP master 720 can issue one or more transaction requests to the target 730.

The pipeline (PIPE#) signal 717 is only used by the AGP master 720 when the AD bus 710 and the C/BE bus are used to issue transaction requests. The PIPE# signal 717 indicates the AD bus 710 and the C/BE bus contain a valid address and command.

The initiator ready (IRDY#) signal 718 is asserted by the AGP master 720 to indicate that it is ready for a data transaction. In a write data transaction, IRDY# 718 asserted indicates that the master 720 is ready to provide data to the target. In a read data transaction, IRDY# 718 asserted indicates that the master 720 is ready to accept data from the target 730.

The target ready (TRDY#) signal 719 is asserted by the AGP target 730 to indicate that it is ready for a data transaction. In a write data transaction, TRDY# 719 asserted indicates the target 730 is ready to accept data from the master 720. In a read data transaction, TRDY# 719 asserted indicates the target 730 is ready to provide data to the master 720.

Modified Signaling for Symmetrical AGP

Figure 8:
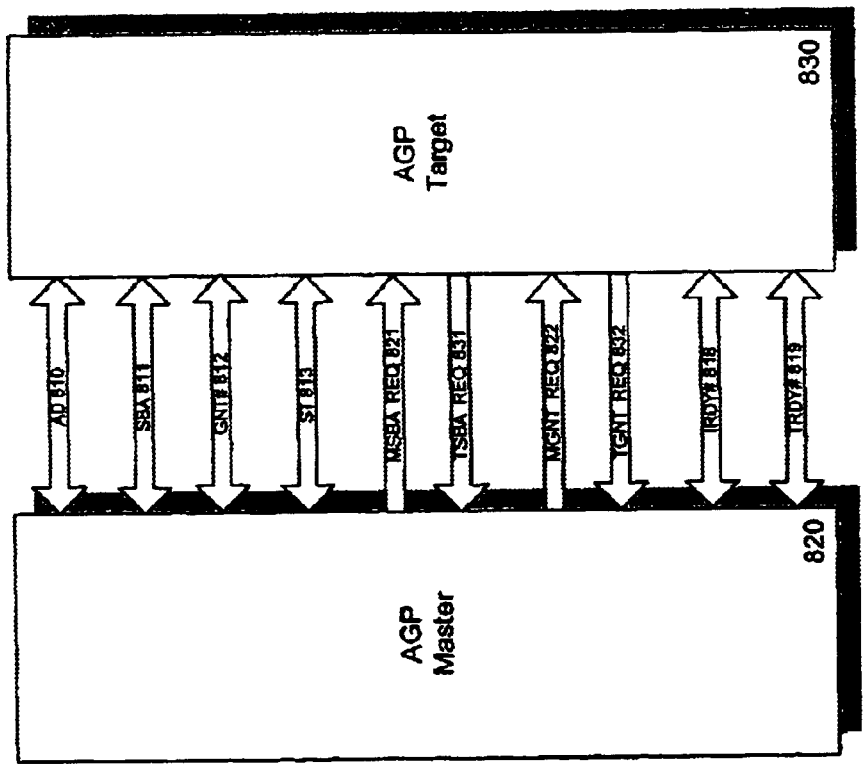
FIG. 8 is a block diagram that illustrates modifications to the signaling of FIG. 7 to implement symmetrical AGP according to one embodiment of the present invention.

FIG. 8 is a block diagram that illustrates modifications to the signaling of FIG. 7 to implement symmetrical. AGP according to one embodiment of the present invention. Although, according to this embodiment, an AGP target 830 is given initiator capabilities. and an AGP master 820 is allowed to act as a target thereby letting each have the role of the other, for purposes of this discussion, the integrated graphics controller and the upgrade graphics controller will continue to be referred to as the target and master, respectively, in accordance with AGP convention. It should be understood and it is contemplated herein that a core logic device may also act as a master to a graphics controller target.

In this example, the following signals are depicted: an Address/Data (AD) bus 810, a sideband address (SBA) port 811, a grant (GNT#) signal 812, a status (ST) bus 813, a master SBA request (MSBA_REQ) signal 821, a target SBA request (TSBA_REQ) signal 831, a master grant request (MGNT_REQ) signal 822, a target grant request (TGNT_REQ) signal 832, an initiator ready (IRDY#) signal 818, and a target ready (TRDY#) signal 819. Importantly, with the exception of the MSBA_REQ signal 821, the TSBA_REQ signal 831, the MGNT_REQ signal 822, and the TGNT_REQ signal 832, all the signals are now bidirectional thereby facilitating symmetric AGP capabilities.

As illustrated by various examples above, it is sometimes desirable to allow either graphics controller 310 and 320 to initiate AGP commands to be serviced by the other device. This requires that the integrated graphics controller (target) have a means of gaining control of the SBA port 811 together with their associated strobes to transmit commands. Also, the upgrade graphics controller (master) must be able to gain control of GNT# signal 812 and the ST bus 813 that together are used to initiate the data transfers that complete a previously received AGP command. Therefore, the SBA port 811 and the combination of the GNT# signal 812 and the ST bus 813 form two resources that need to be arbitrated.

Preferably, to maximize performance, the SBA port 811 and the combination of the GNT# signal 812 and the ST bus 813 should be arbitrated independently thereby allowing a device to schedule the completion of an AGP command by the assertion of the GNT# signal 812 while simultaneously delivering a new AGP command to the other device. Alternatively, an assumption could be made that the SBA port 811 and both the GNT# signal 812 and the ST bus 813 point in the same direction. However, this would have the effect of inhibiting the concurrent completion scheduling and delivery of a new AGP command to the other device as discussed above thereby providing a lesser performance embodiment.

With regard to the AD bus 810, the C/BE bus, the IRDY# signal 818, and the TRDY# signal 819, the grants determines what kind of transaction is happening on the AD bus 810 next, e.g., direction of the data flow, what transaction type is being completed, etc. Therefore, these signals may be scheduled based on the state of the ST bus 813 when the GNT# signal 812 is asserted and the subsequent data flow control.

According to one embodiment, the REQ# signal 716 and the WBF# signal 714, referred to in this example as the MSBA_REQ signal 821 and the TSBA_REQ signal 831, are used as a request pair for the SBA port 811. In addition, the PIPE# signal 717 and the SERR# signal 715, referred to in this example as the MGNT_REQ signal 822 and the TGNT_REQ signal 832, are used as a request pair for both the GNT# signal 812 and the ST bus 813. While one or more other signals may be used in place of one or more of the REQ# signal 716, the WBF# signal 714, the PIPE# signal 717, and the SERR# signal 715 for purposes of gaining access to the SBA port 811 and GNT#/ST, a brief justification for these choices will now be provided.

The AGP specification allows the AGP target 830 to deliver fast writes to the AGP master 820 using a modified PCI protocol. This is not required if the AGP target 830 can acquire mastership. In this case, AGP write commands can be used for high bandwidth data transfer. Consequently, this removes the need for the WBF# signal 714.

From the discussion above with respect to FIG. 7, it should be apparent that the PIPE# signal 717 and the SBA port 711 are two different mechanisms/syntaxes to communicate essentially the same thing, e.g., the same set of commands. That is, there is nothing of significance that can be accomplished with the PIPE# signal 717 that couldn't be implemented with the SBA port 711. Since the SBA port 711 is higher performance and the PIPE# signal 717 and the SBA port 711 are relatively equivalent, the PIPE# signal 717 is no longer needed as a delivery mechanism.

A reserved AGP command opcode may be used to implement a virtual wire function. Virtual wires can be used to implement the SERR# signal 715 and the PCI REQ# signal 716. Therefore, there is no need for these signals.

Advantageously, by using existing AGP pins for arbitrating the two resources, symmetric AGP may be implemented on a standard AGP connector. In alternative embodiments, however, a motherboard down device may be used or a new connector type may be employed thereby allowing other pins than those specified above to be employed for arbitration.

AGP Device Architecture

Figure 9:
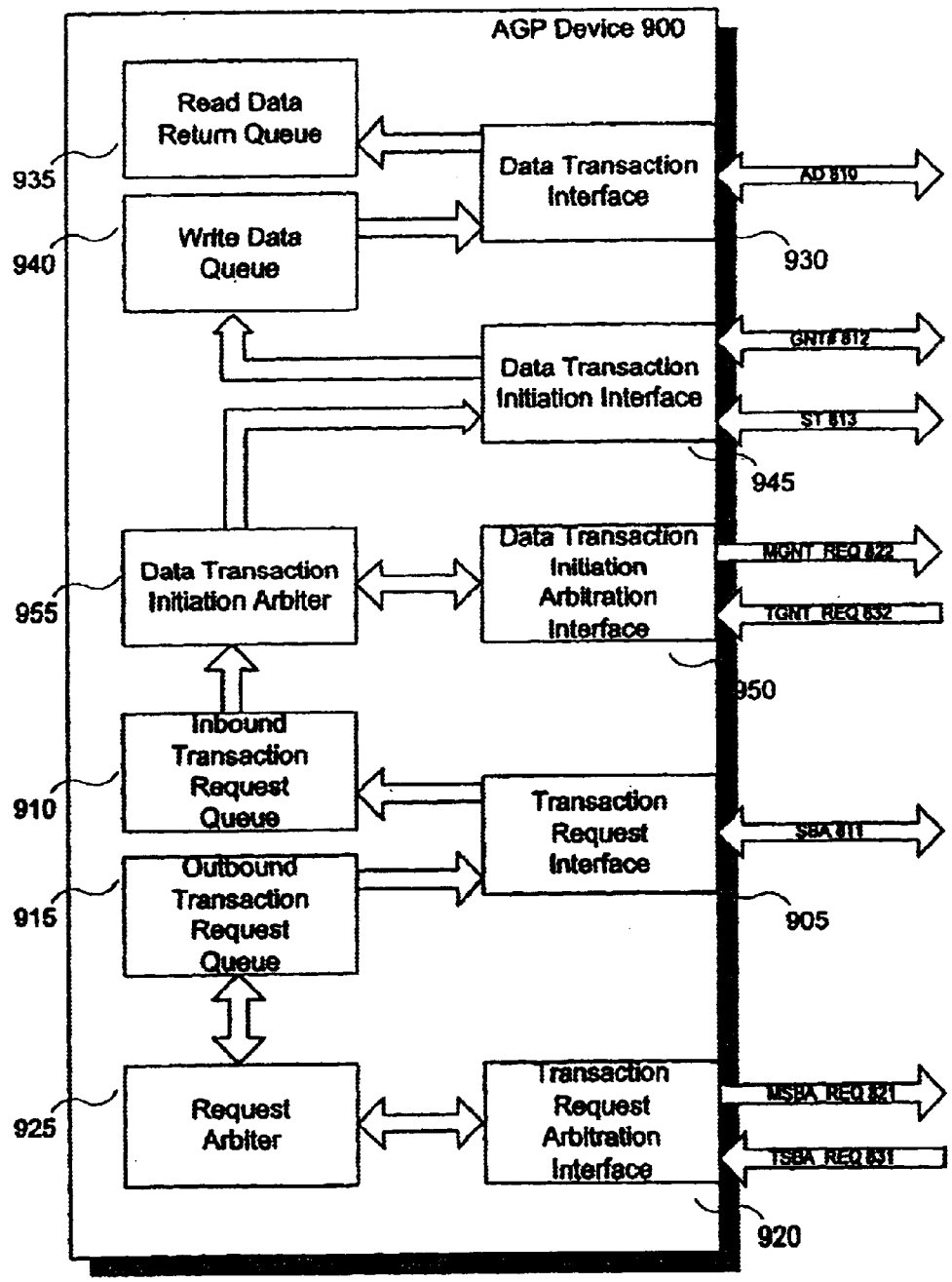
FIG. 9 is a block diagram illustrating an AGP device architecture and data flow among the relevant components according to one embodiment of the present invention.

FIG. 9 is a block diagram illustrating an architecture of an AGP device 1000 representing an AGP master or an AGP target according to one embodiment of the present invention. In the embodiment depicted, the AGP device 900 includes five bus interfaces: a transaction request interface 905, a transaction request arbitration interface 920, a data transaction interface 930, a data transaction initiation interface 945, and a data transaction initiation arbitration interface 950.

The transaction request arbitration interface 920 is coupled to the request pair for the SBA port 811, i.e., the MSBA_REQ signal 821 and the TSBA_REQ signal 831. In this example, arbitration is distributed between a request arbiter 925 of the AGP device 900 and a request arbiter on the other graphics controller. Preferably, both arbiters implement a common round-robin arbitration scheme. According to this embodiment, the request arbiter 925 asserts the MSBA_REQ signal 821 on behalf of the AGP device 900 if any commands are present in the outbound transaction request queue 915.

The transaction request interface 905 is coupled to the SBA port 811 for transmitting and receiving commands to/from the other graphics controller. Commands received from the other graphics controller are enqueued on the inbound transaction request queue 910 to await subsequent processing. If one or more commands reside in the outbound transaction request queue 915, then the command at the front of the queue is transmitted to the other graphics controller upon receiving an indication from the request arbiter 925 that the AGP device 900 has been granted access to the SBA port 811.

The data transaction initiation arbitration interface 950 is coupled to the request pair for the GNT# signal 812 and the ST bus 813, i.e., the MGNT_REQ signal 822 and the TGNT_REQ signal 832. As above, in this example, arbitration is distributed between a data transaction arbiter 955 of the AGP device 900 and a corresponding arbiter on the other graphics controller. Preferably, both arbiters implement a common round-robin arbitration scheme. According to this embodiment, the data transaction arbiter 955 asserts the MGNT_REQ signal 822 on behalf of the AGP device 900 in response to the processing of a previously enqueued write command on the inbound transaction request queue 910 indicating that the other device has requested to initiate a write transaction to the AGP device 900. Subsequently, if the AGP device 900 is granted access to the GNT# 812 signal, the data transaction initiation arbiter asserts the GNT# 812 signal on behalf of the AGP device 900 and transmits a status value indicating the AGP device 900 is ready for the other device to provide the for the previously enqueued write command.

The data transaction initiation interface 945 is coupled to the GNT# signal 812 and the ST bus 813 for transmitting and receiving grants to/from the other device. If the grant indicates the other device is ready to receive data corresponding to a write command previously transmitted by the AGP device 900 to the other device, then the data transaction initiation interface causes the write data queue to source data onto the AD bus 810.

The data transaction interface 930 is coupled to the AD bus 810 for transmitting and receiving data to/from the other graphics controller. Data received from the other graphics controller is temporarily stored in the read data return queue 935 to await subsequent processing by the AGP device 900.

Graphics Controller Synchronization

While for the most part the driver treats the combination of graphics controllers 310 and 320 as one virtual device, as indicated above, it is sometimes necessary for the driver to know if the graphics engines have processed the command list to a given point or cause the graphics engines to become synchronized at a given point.

According to one embodiment, to cause a synchronization point, the driver can drop two commands, e.g., ACK1 and ACK2. Each graphics controller will process the synchronization command directed to it and will ignore the synchronization command directed to the other graphics controller. Alternatively, at initialization time, one graphics controller can be set up to be primarily responsible for acknowledgement. According to this scenario, when the primary controller encounters the synchronization point in the command list, then based upon acknowledgement status from the secondary controller, the primary controller can act on behalf of both devices. For example, the primary may acknowledge on behalf of both devices after both have passed the synchronization point. Advantageously, in this manner, after initialization, the driver can simply treat the virtual graphics controller as a single device.

According to one embodiment, two different types of acknowledgements may be employed, a synchronization type and an update type. For the synchronization type of acknowledgement, the graphics controller serving as the primary acknowledgement agent not only needs to acknowledge on behalf of both devices, but has to release the secondary device. For the update type of acknowledgement, the primary acknowledgement agent need not wait for the other. Importantly, because one graphics controller may encounter multiple acknowledgements in the command list before the other, it may be useful for the primary acknowledgement agent to queue ACK information, such as the acknowledgement along with an indication regarding what action to take and indication regarding which of the graphics controllers 310 and 320 is ahead.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A graphics controller comprising:

a first bus interface to receive Accelerated Graphics Port (AGP) transaction requests from a core logic device and to transmit AGP transaction requests to the core logic device;

a request queue coupled to the first bus interface to buffer received AGP transaction requests;

a second bus interface to exchange requests for access to the first bus interface between the core logic device and the graphics controller;

a request arbiter coupled to the second bus interface to arbitrate access to the first bus interface;

a third bus interface to initiate data transactions by the graphics controller and to receive data transactions initiated by the core logic device;

a fourth bus interface to exchange requests for access to the third bus interface between the core logic device and the graphics controller; and a data transaction arbiter coupled to the fourth bus interface to arbitrate access to the fourth bus interface.

2. The graphics controller of claim 1, wherein the request arbiter and a corresponding request arbiter of the core logic device implement a common, distributed arbitration mechanism.

3. The graphics controller of claim 1, wherein the first bus interface comprises one or more pins associated with AGP sideband address port signaling.

4. The graphics controller of claim 3, wherein the second bus interface comprises one or more pins associated with AGP REQ# and WBF# signaling.

5. The graphics controller of claim 1, wherein the third bus interface comprises one or more pins associated with AGP GNT#/ST signaling.

6. The graphics controller of claim 5, wherein the fourth bus interface comprises one or more pins associated with AGP SERR# and PCI REQ# signaling.

7. An integrated graphics controller for an Accelerated Graphics Port (AGP) chipset comprising:

a first bus interface to receive AGP transaction requests from an upgrade graphics controller associated with an expansion card and to transmit AGP transaction requests to the upgrade graphics controller;

a request queue coupled to the first bus interface to buffer received AGP transaction requests;

a second bus interface to exchange requests for access to the first bus interface between the upgrade graphics controller and the integrated graphics controller;

a request arbiter coupled to the second bus interface to arbitrate access to the first bus interface;

a third bus interface to initiate data transactions by the integrated graphics controller and to receive data transactions initiated by the upgrade graphics controller;

a fourth bus interface over which requests for access to the third bus interface may be exchanged between the core logic device and the graphics controller; and a data transaction arbiter coupled to the fourth bus interface to arbitrate access to the fourth bus interface.

8. The integrated graphics controller of claim 7, wherein the request arbiter and a corresponding request arbiter of the upgrade graphics controller implement a common, distributed arbitration mechanism.

9. The integrated graphics controller of claim 7, wherein the first bus interface comprises one or more pins associated with AGP sideband address port signaling.

10. The integrated graphics controller of claim 9, wherein the second bus interface comprises one or more pins associated with AGP REQ# and WBF# signaling.

11. The integrated graphics controller of claim 7, wherein the third bus interface comprises one or more pins associated with AGP GNT#/ST signaling.

12. The integrated graphics controller of claim 11, wherein the fourth bus interface comprises one or more pins associated with AGP SERR# and PCI REQ# signaling.

* * * * *

UNITED STATES PATENT AND TRADEMARK OFFICE
CERTIFICATE OF CORRECTION

PATENT NO. : 6,624,817 B1  Page 1 of 1
DATED : September 23, 2003
INVENTOR(S) : Langendorf It is certified that error appears in the above-identified patent and that said Letters Patent is hereby corrected as shown below:

<u>Column 3,</u>
Line 31, delete "generalDocket purpose", insert -- general-purpose --.

Signed and Sealed this

Seventeenth Day of February, 2004

JON W. DUDAS
*Acting Director of the United States Patent and Trademark Office*